(12) United States Patent
Fukui (10) Patent No.: US 7,177,729 B2
(45) Date of Patent: Feb. 13, 2007

(54) METER FOR VEHICLE

(75) Inventor: Kunihiko Fukui, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/177,109

(22) Filed: Jun. 24, 2002

(65) Prior Publication Data
US 2003/0023351 A1 Jan. 30, 2003

(30) Foreign Application Priority Data
Jul. 24, 2001 (JP) .............................. 2001-223175

(51) Int. Cl.
*B60K 20/00* (2006.01)
*B60Q 1/00* (2006.01)
(52) U.S. Cl. ............................ 701/1; 701/50; 180/65.1
(58) Field of Classification Search .................... 701/1, 701/35, 50, 38; 340/425.5, 438, 459; 180/65.1, 180/65.8
See application file for complete search history.

(56) References Cited

U.S. PATENT DOCUMENTS

| | | | | |
|---|---|---|---|---|
| 4,973,942 A | * | 11/1990 | Iino | ............................. 340/438 |
| 5,065,320 A | * | 11/1991 | Hayashi et al. | ........ 364/424.01 |
| 5,428,542 A | * | 6/1995 | Liesveld | ................. 364/424.04 |
| 5,579,242 A | * | 11/1996 | Fisher | ......................... 364/550 |
| 6,229,590 B1 | * | 5/2001 | Bannai et al. | ............... 349/142 |
| 6,320,497 B1 | * | 11/2001 | Fukumoto et al. | ........ 340/425.5 |
| 6,371,886 B1 | * | 4/2002 | Sawa et al. | .................. 477/115 |
| 6,411,880 B1 | * | 6/2002 | McKee et al. | ................. 701/55 |
| 6,462,651 B1 | * | 10/2002 | Consiglio et al. | ............ 340/456 |
| 6,632,156 B2 | * | 10/2003 | Nanri et al. | ................... 477/68 |

FOREIGN PATENT DOCUMENTS

JP 2000-108712 A 4/2000

* cited by examiner

*Primary Examiner*—Dalena Tran
(74) *Attorney, Agent, or Firm*—Birch, Stewart, Kolasch & Birch, LLP (57) ABSTRACT

A meter for a vehicle has a transmission display part for displaying the gear position of a transmission and a driving mode, a speed display part for displaying vehicle speed, and a drive distance display part for displaying drive distance. A display area for selectively displaying only one of a plurality of gear positions is provided in the transmission display part. The meter for a vehicle has excellent visibility in spite of having a small display area. Furthermore, miniaturization of the meter for a vehicle can be achieved.

25 Claims, 9 Drawing Sheets

METER FOR VEHICLE

CROSS-REFERENCE TO RELATED APPLICATIONS

This non provisional application claims priority under 35 U.S.C. § 119(a) on Patent Application No. 2001-223175 filed in Japan on Jul. 24, 2001, the entirety of which is hereby incorporated by reference.

BACKGROUND OF THE INVENTION

1. Field of the Invention

The present invention relates to improvements in meters for a vehicle. In particular, the present invention relates to a meter for a vehicle having a transmission display part for displaying a gear position of a transmission of a vehicle and a driving mode, a speed display part for displaying vehicle speed, and a drive distance display part for displaying drive distance.

2. Description of Background Art

A meter for a vehicle is known from, for example, Japanese Patent Publication No. 2000-108712 entitled "DISPLAY DEVICE FOR VEHICLE."

Referring to FIG. 1 of the above publication, when an automatic transmission is used in an automatic mode, each gear position of the automatic transmission is displayed by illuminating any of a plurality of characters "P", "r", "N", "4", "3", and "2." The characters are arranged in a lateral line and are printed in a gear position display part 30. When the automatic transmission is used in a manual mode, a drive distance recorder 10 formed by a liquid crystal display is switched to the gear position display to display any of a plurality of numbers "1", "2", "3", and "4", thereby displaying the gear position of the automatic transmission. "1 to 4" denote the first to fourth speeds, "P" indicates park, "R" indicates reverse, and "N" expresses neutral.

In the display device for a vehicle according to the above publication; however, the characters "P", "R", "N", "4", "3", and "2" are arranged in a lateral line. Accordingly, in order to display the characters, a wide display area is necessary and the size of the display for the vehicle is therefore large.

In the situation where the size of the display area cannot be sufficiently assured, the characters "P", "R", "N", "4", "3", and "2" must be small characters. Accordingly, deterioration in visibility occurs.

SUMMARY OF THE INVENTION

An object of the present invention is therefore to realize a meter for a vehicle, which has excellent visibility in spite of having a small display area. In addition, an object of the present invention is to provide a technique of realizing miniaturization of the meter for a vehicle.

To achieve the above objects, according to a first aspect of the present invention, a meter for a vehicle is provided, which includes a transmission display part for displaying a gear position of a transmission of a vehicle and a driving mode, a speed display part for displaying vehicle speed, and a drive distance display part for displaying drive distance. A display area for selectively displaying only one of a plurality of gear positions is provided in the transmission display part.

By providing the display area for displaying only one of the plurality of gear positions in the transmission display part, the plurality of gear positions can be displayed in the display area.

Since the plurality of gear positions can be displayed in the single display area, a smaller sized meter for a vehicle can be realized. Since each of the gear positions can be displayed in large size, visibility can be improved. In other words, a meter for a vehicle can be realized, which has excellent visibility in spite of having a small display area. In addition, the miniaturization of the meter for a vehicle can be therefore be achieved.

According to a second aspect of the present invention, a display area of the driving mode is disposed over or below a display area of the gear position, thereby forming the transmission display part so as to be vertically long.

By forming the transmission display part vertically long, for example, other display parts such as the speed display part and the drive distance display part can be easily disposed.

According to a third aspect of the present invention, the speed display part is arranged on a side of the transmission display part.

By arranging the speed display part on a side of the transmission display part, the gear position for vehicle, the speed and the driving position are made easily recognized. As a result, the drivability can be improved.

According to a fourth aspect of the present invention, the drive distance display part is disposed over or below the speed display part. Furthermore, the transmission display part is disposed on a side of the speed display part and the drive distance display part.

By disposing the drive distance display part over or below the speed display part and disposing the transmission display part on a side of the speed display part and the drive distance display part, the display area of the meter for a vehicle is effectively used. As a result, the miniaturization of the meter for a vehicle can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will now be described hereinbelow with reference to the accompanying drawings. The terms "front", "back", "left", "right", "up", and "down" are directions from the perspective of the driver. The terms "Fr", "Rr", "L", and "R" indicate front side, rear side, left side, and right side, respectively. The drawings should be view in the direction of orientation of the reference numerals.

Figure 1:
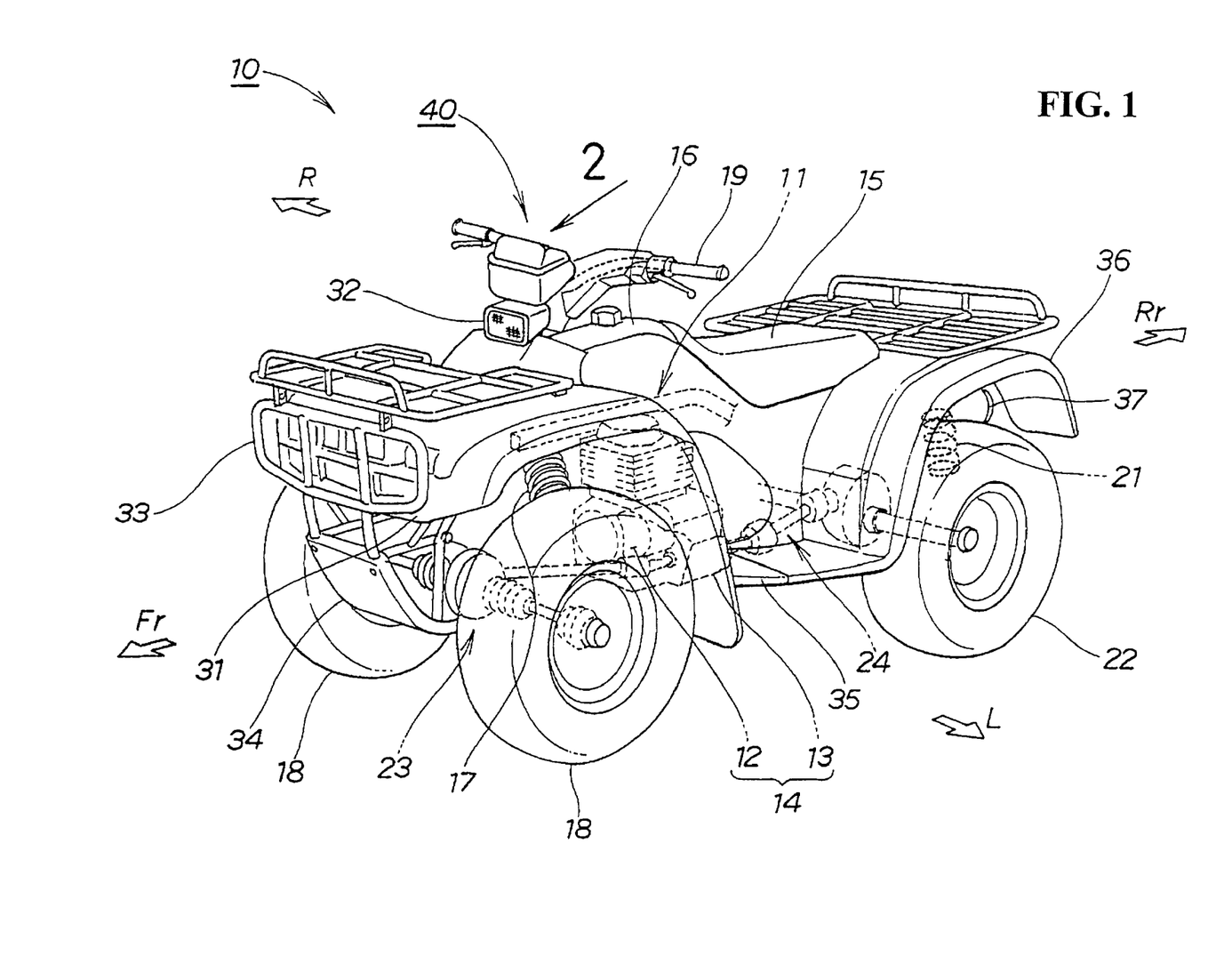
FIG. 1 is a perspective view of a saddle-riding type vehicle on which a meter for a vehicle according to the present invention is mounted.

FIG. 1 is a perspective view of a saddle-riding type vehicle on which a meter for a vehicle according to the present invention is mounted. A saddle-riding type vehicle 10 includes, as main components, a vehicle body frame II, a power unit 14 including an engine 12 and a transmission 13 mounted in the center portion of the vehicle body frame 11. A saddle-type seat 15 is provided over the power unit 14. A fuel tank 16 is disposed in the front part of the saddle-type seat 15. Front wheels 18 and 18 are rotatably attached to the front side parts of the vehicle body frame 11 via right and left suspending mechanisms 17 and 17 (the suspending mechanism 17 on the rear side is not shown). A handle bar or steering wheel 19 is provided for steering the front wheels 18 and 18. Rear wheels 22 and 22 (the rear wheel 22 on the rear side is not shown) are rotatably attached to the rear side parts of the vehicle body frame 11 via right and left suspending mechanisms 21 and 21 (the suspending mechanism 21 on the rear side is not shown). A front-side power transmitting mechanism 23 is provided for transmitting rotation of the engine 12 to the front wheels 18 and 18. A rear-side power transmitting mechanism 24 is provided for transmitting rotation of the engine 12 to the rear wheels 22 and 22.

Reference numeral 31 identifies a front fender, 32 identifies a head lamp, 33 identifies a front bumper, 34 identifies an undercover, 35 identifies a floor step, 36 identifies a rear fender, and 37 identifies a muffler.

The saddle-riding type vehicle 10 is a buggy of a four-wheel-drive type and is a vehicle classified as an ATV (All Terrain Vehicle). The vehicle body is light and compact, the vehicle can turn in a small space and the vehicle can be easily operated. Consequently, the vehicle is a dedicated off-road vehicle suitable for agriculture, stock farming, hunting, patrolling, and recreation.

Figure 2:
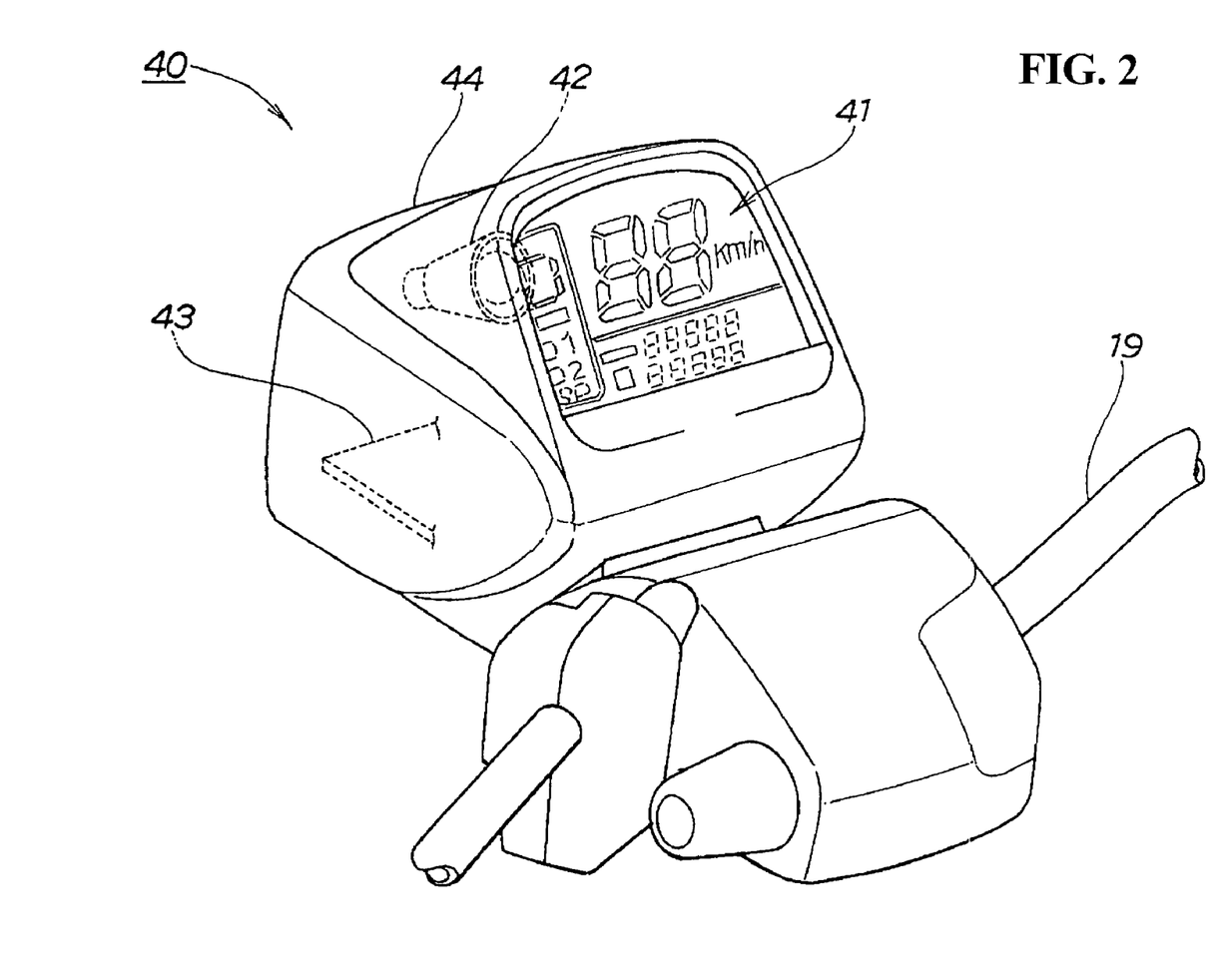
FIG. 2 is a view in the direction of the arrow 2 of FIG. 1.

FIG. 2 is a perspective view of a meter 40 for a vehicle according to the present invention, which is viewed in the direction shown by the arrow 2 in FIG. 1.

The meter 40 for a vehicle includes a liquid crystal display device 41 for displaying driving information, a back light 42 for illuminating the liquid crystal display device 41. A control unit 43 is provided for controlling the liquid crystal display device 41 and back light 42. A housing 44 is provided for collectively housing the liquid crystal display device 41, back light 42, and control unit 43. The meter 40 is a display device attached to the center front portion of the handle bar or steering wheel 19.

Figure 3:
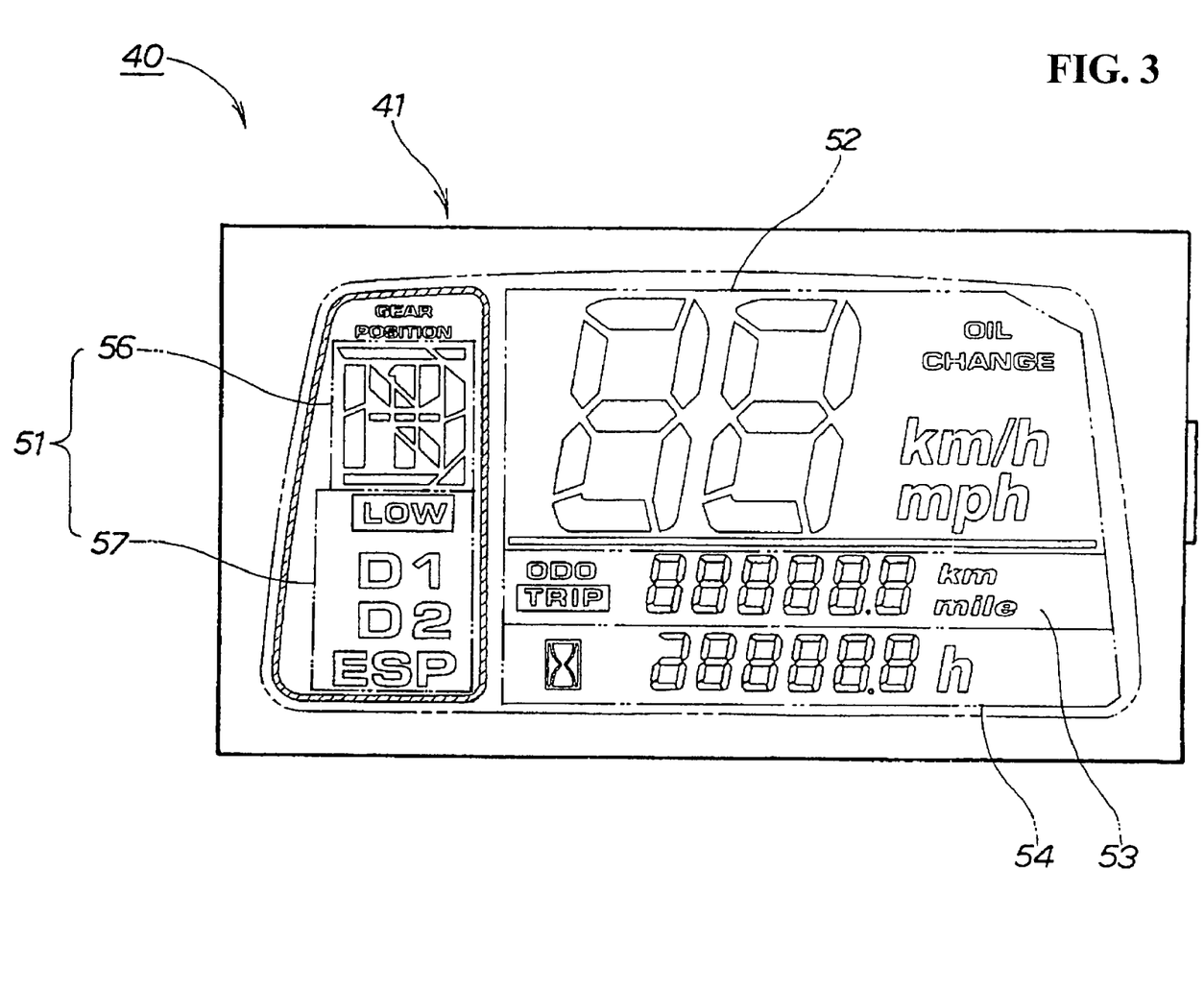
FIG. 3 is a front view of a display pattern of the meter for vehicle according to the present invention.

FIG. 3 is a front view of a display pattern of the meter for a vehicle according to the present invention. In the meter 40 for a vehicle (liquid crystal display device 41), a transmission display part 51 is provided for displaying the gear position and the driving mode. A speed display part 52 is provided for displaying vehicle speed. A drive distance display part 53 is provided for displaying a drive distance. Furthermore, a time display part 54 is provided for displaying the time from turn-on of an ignition switch to the current time.

The transmission display part 51 is constructed by a display area 56 for selectively displaying only one of a plurality of gear positions, and a display area 57 for displaying a driving mode. The transmission display part 51 is a vertically-long transmission display part in which the display area 57 for displaying the driving mode is disposed below the display area 56 for selectively displaying only the gear position.

In other words, in the meter 40 for a vehicle, by disposing the display area 57 of the driving mode below or over the display area 56 of the gear position, the transmission display part 51 is formed vertically-long.

By forming the transmission display part 51 vertically-long, for example, other display parts such as the speed display part 52 and the drive distance display part 53 can be easily disposed.

The speed display part 52 is a part for displaying speed. The speed display part 52 is disposed on a side of the transmission display part 51 and is formed as the largest part in the upper part at almost the center of the liquid crystal display device 41.

In other words, the meter 40 for a vehicle is obtained by disposing the vehicle display part 52 on a side of the transmission display part 51.

By disposing the speed display part 52 on the side of the transmission display part 51, the gear position for the vehicle speed and the driving position can be easily recognized. As a result, the drivability can be improved.

The drive distance display part 53 is a part formed below the speed display part 52. In the drive distance display part, the odometer display and trip display can be alternately displayed.

The time display part 54 is a part disposed below the drive distance display part 53, for displaying the time since the turn-on of the ignition switch until the present time. The time display part 54 can be also switched to display the present time.

In other words, the meter 40 for a vehicle is obtained by disposing the drive distance display part 53 below the speed display part 52, and disposing the transmission display part 51 on a side of the speed display part 52 and the drive distance display part 53.

By disposing the drive distance display part 53 below the speed display part 52 and disposing the transmission display part 51 on the side of the speed display part 52 and the drive distance display part 53, the display area of the meter 40 for a vehicle is effectively used. As a result, a smaller size of the meter 40 for a vehicle can be achieved.

Figure 4:
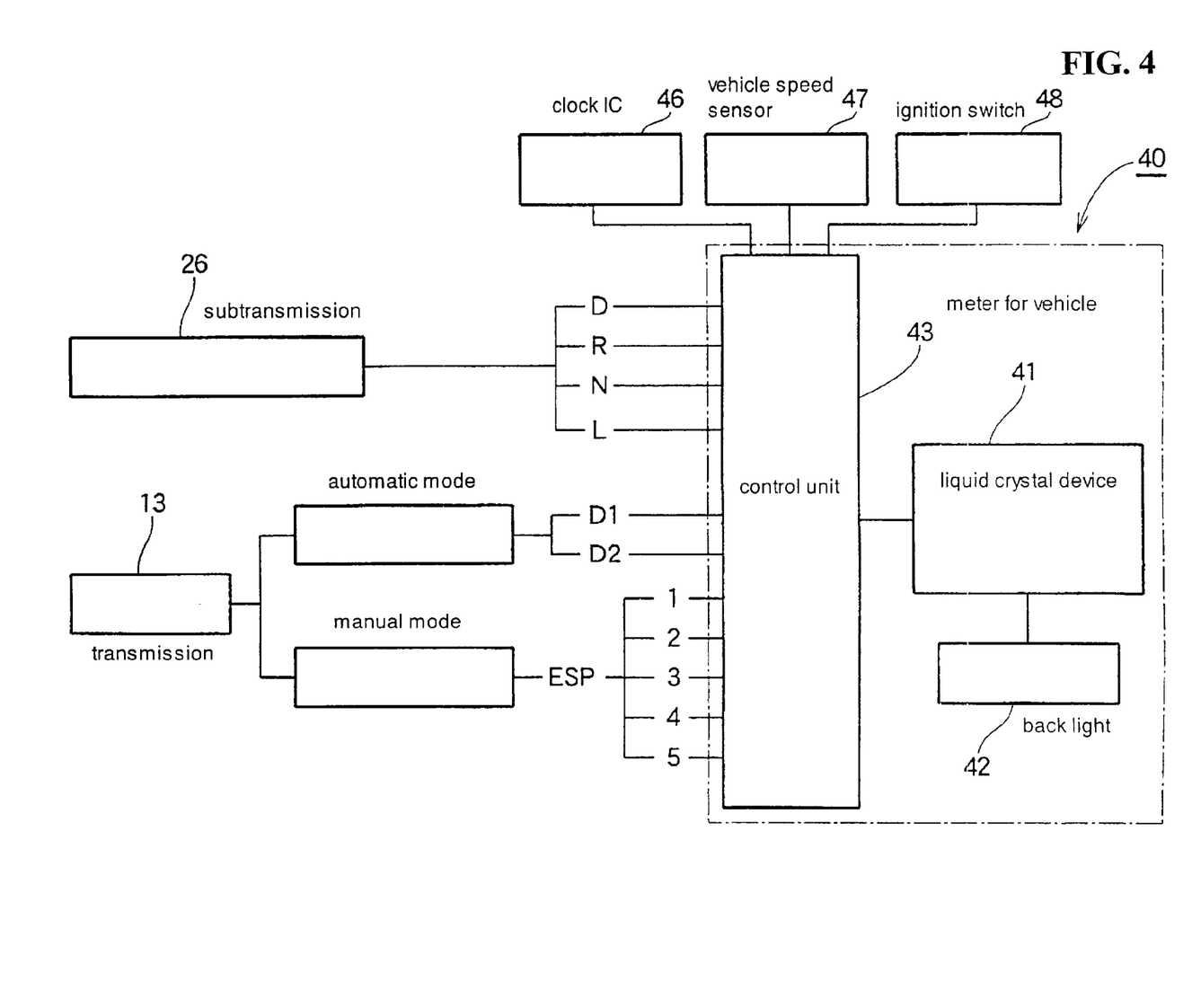
FIG. 4 is a system diagram of the meter for a vehicle according to the present invention.

FIG. 4 is a system diagram of a meter for a vehicle according to the present invention. The meter 40 for a vehicle receives transmission information of the transmission into the control unit 43, time information from a clock IC 46 into the control unit 43, vehicle speed information and drive distance information from a vehicle speed sensor 47, and engine start information from an ignition switch 48.

From this information, the transmission, speed, drive distance, and time is displayed in the liquid crystal display device 41.

The transmission 13 is an automatic transmission having five speeds with a low speed gear, which is capable of being set in an automatic mode or manual mode. In addition, the transmission 13 has a subtransmission 26.

First, in order to determine whether the transmission 13 is set in the automatic mode or the manual mode, information from the ESP (automatic/manual change-over switch) is input to the control unit 43.

In the situation where the automatic mode is set, the gear position (selection position of the subtransmission) is set to D (drive), R (reverse), N (neutral), or L (low), or information that the driving mode is set as D1 (drive 1) or D2 (drive 2) is input to the control unit 43.

In the situation where the manual mode is set, information that the sub transmission is set to the D (drive) or L (low) and the gear position (selected gear of the transmission) is set to the first speed, second speed, third speed, fourth speed, or fifth speed is input to the control unit 43.

The gear position denotes a selected position of the sub transmission or a gear used in the transmission.

In short, the meter 40 for a vehicle displays "D", "R", "N", "LOW", "D1", "D2", "L", "1", "2", "3", "4", "5", and "ESP" in the transmission display part 51 (refer to FIG. 3) in the liquid crystal display device 41 as will be described hereinbelow.

The action of the aforementioned meter for a vehicle will now be described. FIGS. 5 to 8 show an example of a display of the liquid crystal display device 41 depending on the state of the transmission 13.

Figure 5A:
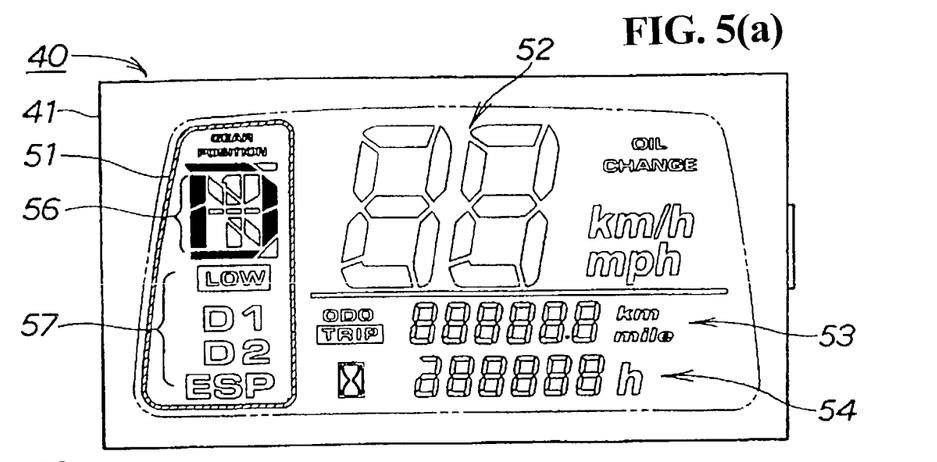
FIG. 5 is an explanatory diagram (No. 1) for explaining the action of the meter for a vehicle according to the present invention.
Figure 5B:
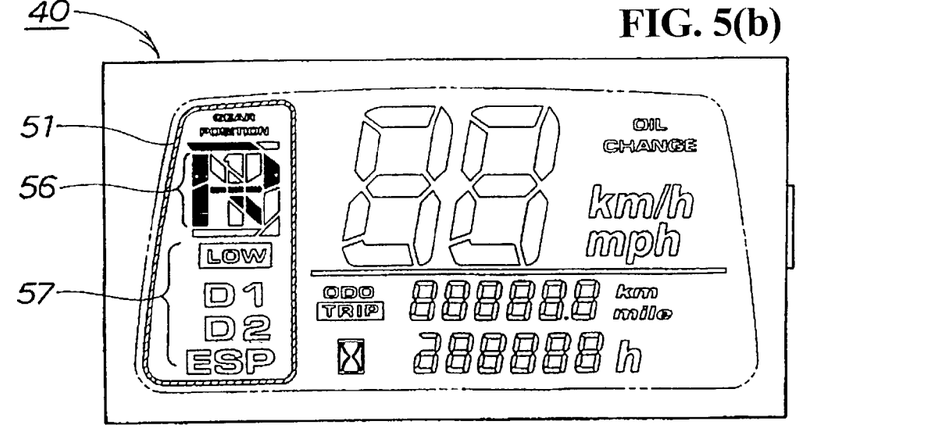
Figure 5C:
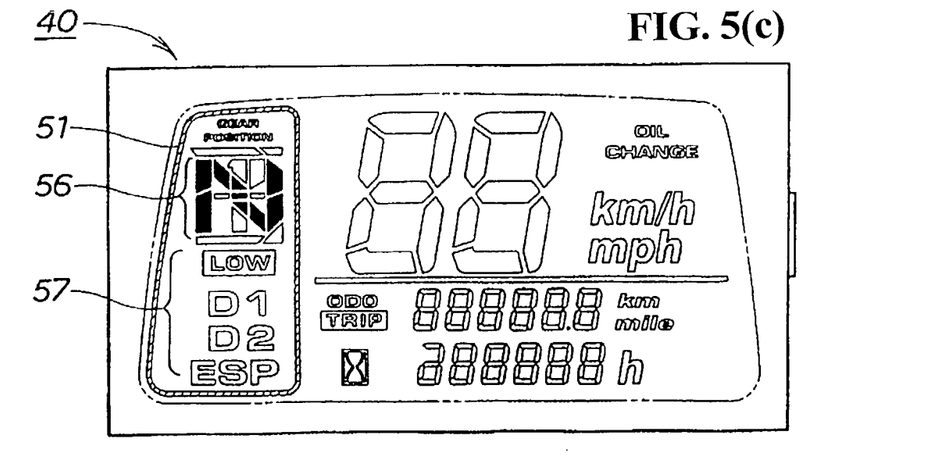

FIGS. 5A to 5C are diagrams (No. 1) for explaining the action of the meter for a vehicle according to the present invention.

FIG. 5A shows a display pattern of the transmission display part 51 when the transmission 13 (refer to FIG. 4) is set in the automatic mode and the subtransmission 26 (refer to FIG. 4) is set in the D (drive) position. Since the driving mode of the transmission 13 is the automatic mode, "ESP" is not illuminated but the graphic character "D" is illuminated.

FIG. 5B shows a display pattern of the transmission display part 51 when the transmission 13 is set in the automatic mode and the subtransmission 26 is set in the "R" (reverse) position. In the display area 56 of the gear position, the graphic character "R" is illuminated.

FIG. 5C shows a display pattern of the transmission display part 51 when the transmission 13 is set in the automatic mode and the subtransmission 26 is set in the N (neutral) position. In the display area 56 of the gear position, the graphic character "N" is illuminated.

Figure 6A:
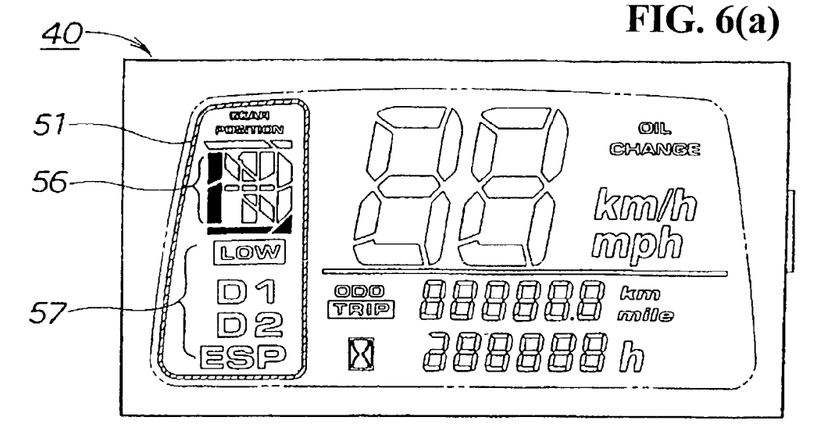
FIG. 6 is an explanatory diagram (No. 2) for explaining the action of the meter for a vehicle according to the present invention.
Figure 6B:
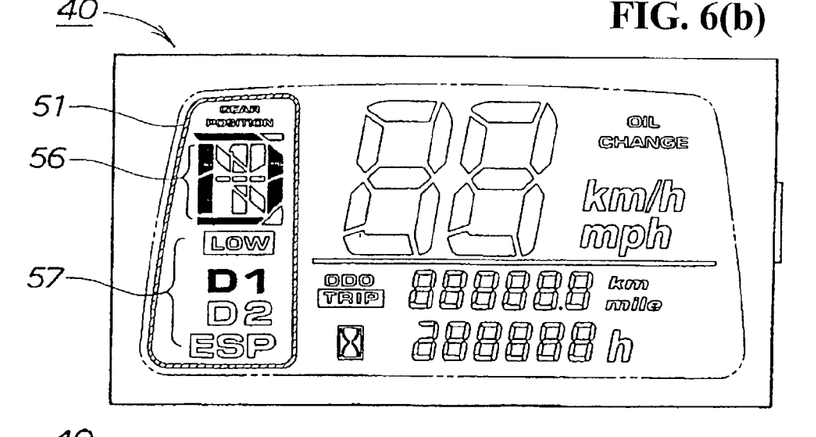
Figure 6C:
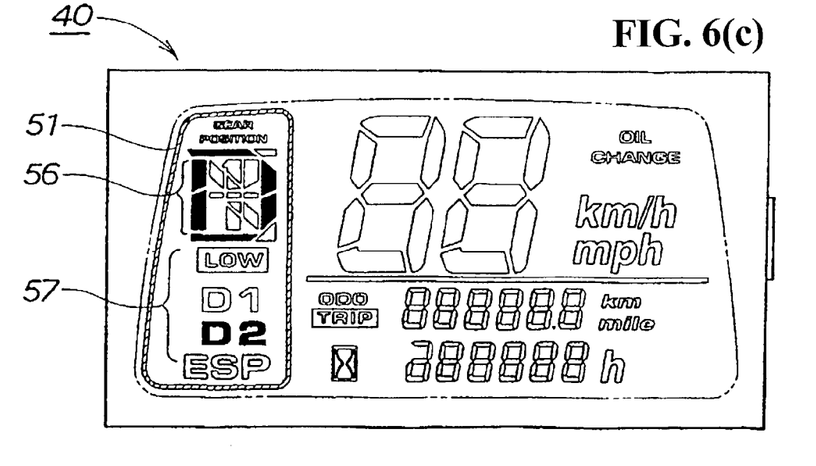

FIGS. 6A to 6C are diagrams (No. 2) for explaining the action of the meter for a vehicle according to the present invention.

FIG. 6A shows a display pattern of the transmission display part 51 when the transmission 13 (refer to FIG. 4) is set in the automatic mode and the subtransmission 26 is set in the L (low) position. In the display area 56 of the gear position, the graphic character "L" is illuminated.

FIG. 6B shows a display pattern of the transmission display part 51 when the transmission 13 is set in the automatic mode, the driving mode is set in the D1 (drive 1) position, and the subtransmission 26 is set in the D (drive) position. In the display area 56 of the gear position, the graphic character "D" is illuminated, and "D1" of the driving mode is illuminated in the display area 57.

FIG. 6C shows a display pattern of the transmission display part 51 when the transmission 13 is set in the D2 (drive 2) position of the automatic mode and the subtransmission 26 is set in the D (drive) position. "D2" in the display area 57 of the driving mode is illuminated.

Figure 7A:
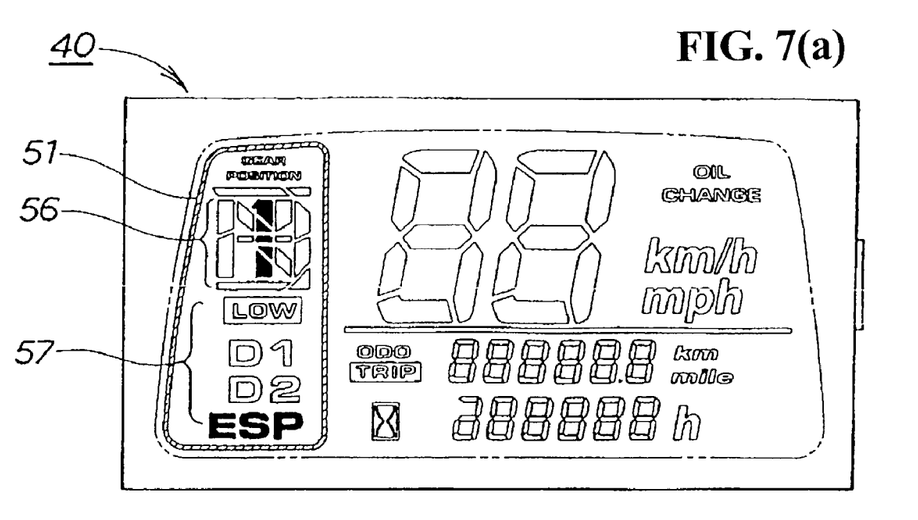
FIG. 7 is an explanatory diagram (No. 3) for explaining the action of the meter for a vehicle according to the present invention.
Figure 7B:
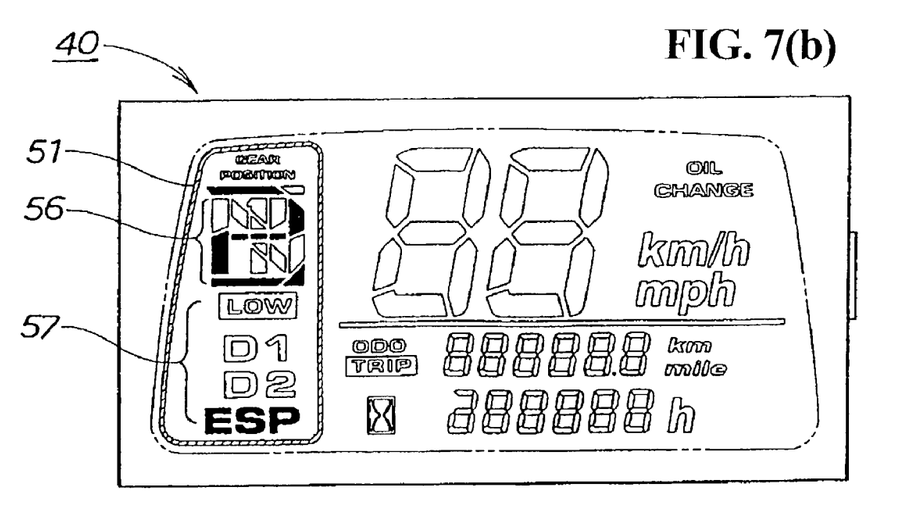

FIGS. 7A and 7B are diagrams (No. 3) for explaining the action of the meter for a vehicle according to the present invention.

FIG. 7A shows a display pattern of the transmission display part 51 when the transmission 13 is set in the manual mode and the gear position (selected gear) is set at the first speed. Since it is the manual mode, "ESP" in the display area 57 of the driving mode is illuminated, and the graphic character "1" is illuminated in the display area 56 of the gear position.

FIG. 7B shows a display pattern of the transmission display part 51 when the transmission 13 is set in the manual mode and the gear position (selected gear) is set at the second speed. In the display area 56 of the gear position, the graphic character "2" is illuminated.

Figure 8A:
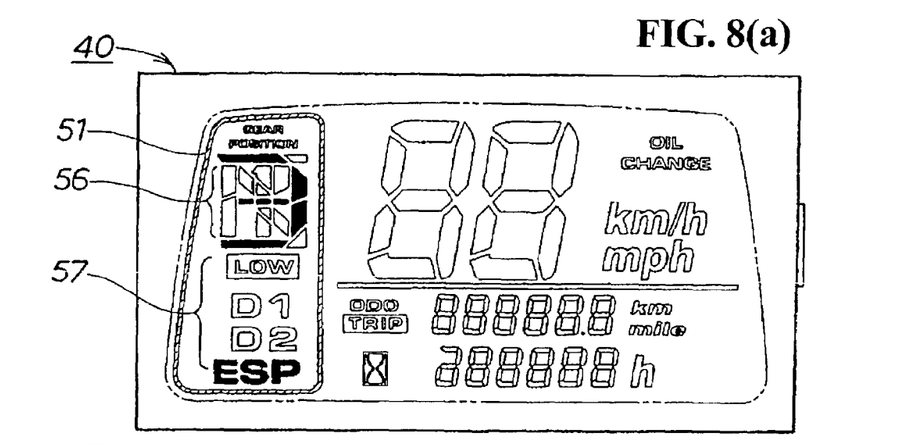
FIG. 8 is an explanatory diagram (No. 4) for explaining the action of the meter for a vehicle according to the present invention.
Figure 8B:
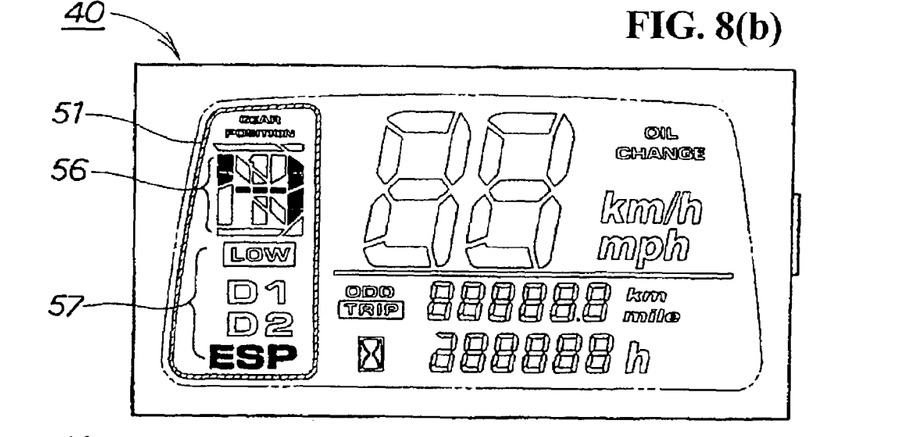
Figure 8C:
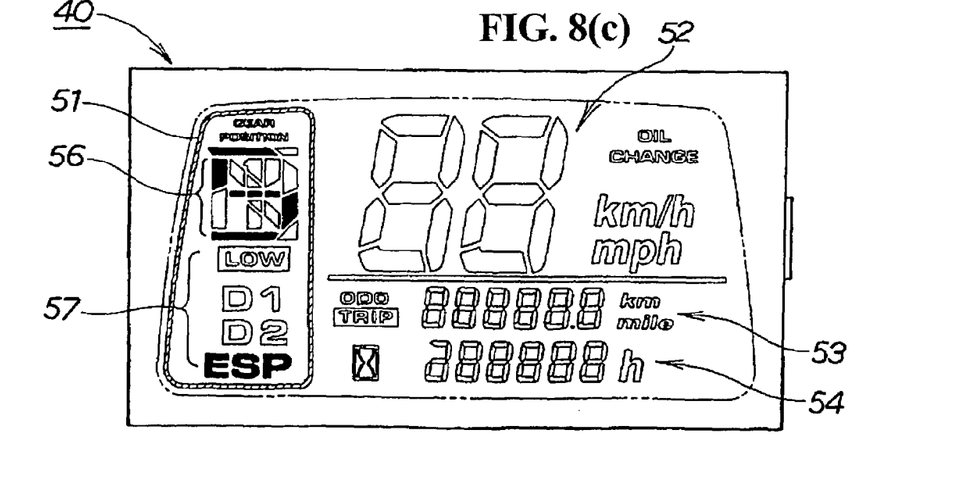

FIGS. 8A to 8C are diagrams (No. 4) for explaining the action of the meter for a vehicle according to the present invention.

FIG. 8A shows a display pattern in the transmission display part 51 when the transmission 13 (refer to FIG. 4) is set in the manual mode and the gear position (selected gear) is set at the third speed. In the display area 56 of the gear position, the graphic character "3" is illuminated.

FIG. 8B shows a display pattern in the transmission display part 51 when the transmission 13 is set in the manual mode and the gear position (selected gear) is set at the fourth speed. In the display area 56 of the gear position, the graphic character "4" is illuminated.

FIG. 8C shows a display pattern in the transmission display part 51 when the transmission 13 is set in the manual mode and the gear position (selected gear) is set at the fifth speed. In the display area 56 of the gear position, the graphic character "5" is illuminated.

Figure 9:
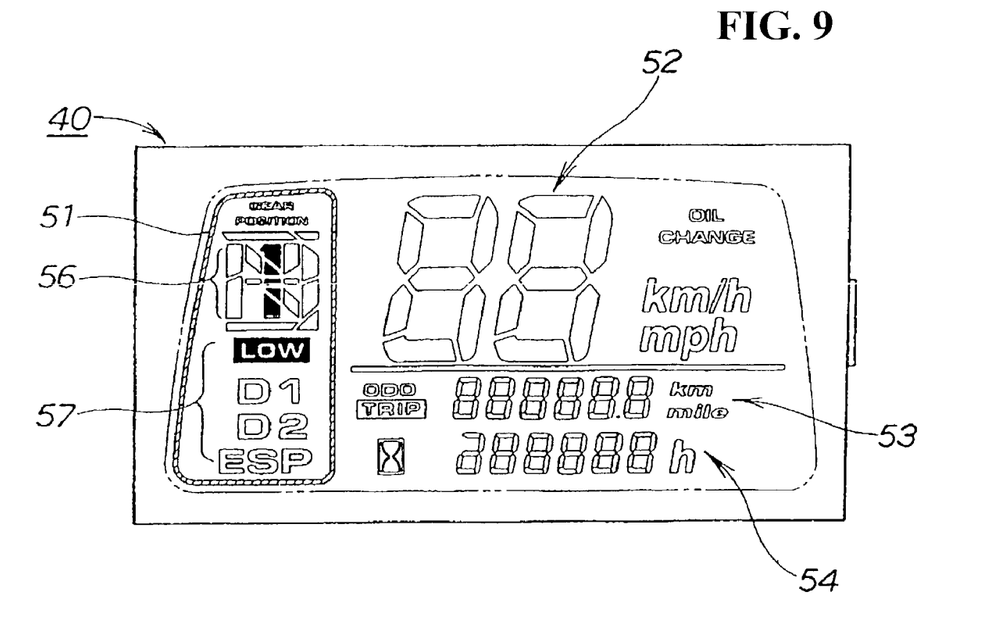
FIG. 9 is an explanatory diagram (No. 5) for explaining the action of the meter for a vehicle according to the present invention.

FIG. 9 is a diagram (No. 5) for explaining the action of the meter for a vehicle according to the present invention.

FIG. 9 shows a display pattern in the transmission display part 51 when the transmission 13 (refer to FIG. 4) is set in the manual mode and the subtransmission 26 (refer to FIG. 4) is set in the L (low) position. Since it is the manual mode, "LOW" and "ESP" in the display area 57 of the driving mode are illuminated, and any of the graphic characters of "1" to "5" is illuminated in the display area 56 of the gear position (only "1" is shown in the drawing).

Consequently, it can be said that the meter 40 for a vehicle has the transmission display part 51 for displaying the gear position of the transmission 13 (refer to FIG. 4) and the driving mode, the speed display part 52 for displaying vehicle speed, and the drive distance display part 53 for displaying the drive distance. The display area 56 for selectively displaying only one gear position from the plurality of gear positions is provided in the transmission display part 51.

In other words, by providing the display area 56 for selectively displaying only one gear position from the plurality of gear positions in the transmission display part 51, a plurality of gear positions are allowed to be displayed in the display area 56.

Since a plurality of gear positions can be displayed in the single display area 56, the size of the meter 40 for a vehicle can be reduced. Since each gear position can be displayed in large size, improved visibility can be achieved. The meter 40 for a vehicle has excellent visibility in spite of the small display area. Accordingly, a smaller size of the meter 40 for a vehicle can be achieved.

Although the meter for a vehicle is provided for a saddle-riding type vehicle 10 as shown in FIG. 1 in the embodiment, the present invention is not limited to this situation. The vehicle may be any vehicle such as a motorcycle, a three-wheeled vehicle, or a four-wheeled vehicle.

In the embodiment, as shown in FIGS. 5 to 9, any of "D", "R", "N", "LOW", "D1", and "D2" is displayed when the transmission is used in the automatic mode and "L", "1", "2", "3", "4" or "5" is displayed when the transmission is used in the manual mode. However, the present invention is not limited to the above. Another display may be added to the display area of the gear position or another display may be added to the display area of the driving mode.

Figure 10:
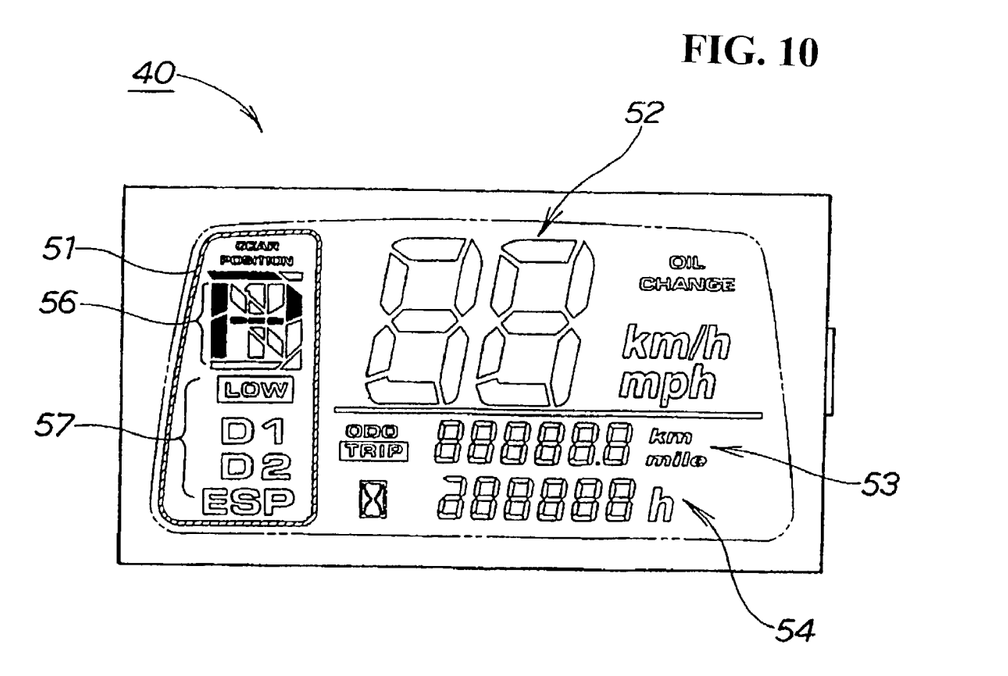
FIG. 10 shows an example of a display of the meter for a vehicle according to the present invention.

FIG. 10 shows an example of a display of the meter for a vehicle according to the present invention. For example, the graphic character "P" may be illuminated in the display area 56 of the gear position and an indication of parking "P" may be added.

Although the liquid crystal display device 41 is used as the display device as shown in FIG. 2 in the embodiment, the present invention is not limited to the liquid crystal display device 41. A plasma display, a light emitting diode, or a CRT (Cathode Ray Tube), a combination of the display device and a liquid crystal display, and a combination of the combination of the display device and the liquid crystal display and a mechanical meter or display panel may be employed.

Although the drive distance display part 53 is disposed below the speed display part 52 as shown in FIG. 3 in the embodiment, the present invention is not limited to the arrangement, but the drive distance display part 53 may be disposed over the speed display part 52.

The present invention produces the following effects by employing the above configuration.

To achieve the object of the present invention, according to a first aspect of the present invention, the display area for selectively displaying only one of a plurality of gear positions is provided in the transmission display part. Thus, miniaturization of the meter for a vehicle can be achieved. Since each of the gear positions can be displayed in large size, the visibility can be improved. That is, a meter for a vehicle having excellent visibility in spite of a small display area can be achieved and miniaturization of the meter for a vehicle can be realized.

According to a second aspect of the present invention, the display area of the driving mode is disposed over or below the display area of the gear position, thereby forming the transmission display part so as to be vertically-long. By forming the transmission display part vertically-long, for example, other display parts such as the speed display part and the drive distance display part can be easily disposed.

According to a third aspect of the present invention, the speed display part is arranged on a side of the transmission display part. Thus, the gear position for vehicle speed and the driving position can be easily recognized. As a result, drivability can be improved.

According to a fourth aspect of the present invention, the drive distance display part is disposed over or below the speed display part, and the transmission display part is disposed on a side of the speed display part and the drive distance display part. Thus, the display area of the meter for a vehicle can be effectively used. As a result, miniaturization of the meter for a vehicle can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A meter for a vehicle, comprising:
 a transmission display part for displaying a gear position of a transmission of a vehicle and an automatic or manual driving mode of the transmission;
 a speed display part for displaying vehicle speed; and
 a drive distance display part for displaying drive distance,
 wherein a single gear position display area that displays only one piece of information at a time is provided in said transmission display part, said single gear position display area being selectively possible to display both automatic gear positions and manual gear positions when the transmission is in the automatic mode and the manual mode.

2. The meter for a vehicle according to claim 1, wherein a display area of said driving mode is disposed over or below a display area of said gear position, thereby forming said transmission display part so as to be vertically-long.

3. The meter for a vehicle according to claim 2, wherein said speed display part is arranged on a side of said transmission display part.

4. The meter for a vehicle according to claim 3, wherein said drive distance display part is disposed over or below said speed display part, and said transmission display part is disposed on a side of the speed display part and the drive distance display part.

5. The meter for a vehicle according to claim 2, wherein said drive distance display part is disposed over or below said speed display part, and said transmission display part is disposed on a side of the speed display part and the drive distance display part.

6. The meter for a vehicle according to claim 1, wherein said speed display part is arranged on a side of said transmission display part.

7. The meter for a vehicle according to claim 3, wherein said drive distance display part is disposed over or below said speed display part, and said transmission display part is disposed on a side of the speed display part and the drive distance display part.

8. The meter for a vehicle according to claim 1, wherein said drive distance display part is disposed over or below said speed display part, and said transmission display part is disposed on a side of the speed display part and the drive distance display part.

9. The meter for a vehicle according to claim 1, wherein said single gear position display area selectively displays one of the gear positions D, R, N and L when the transmission is in the automatic driving mode and selectively displays one of the gear positions 1, 2, 3, 4 and 5 when the transmission is in the manual driving mode.

10. The meter for a vehicle according to claim 1, wherein the transmission includes a subtransmission, and the gear positions displayed in the single gear position display area correspond to a selected position of the subtransmission when the transmission is in the automatic driving mode and a gear used in the transmission when the transmission is in the manual driving mode.

11. A meter for a vehicle, comprising:

a control unit for receiving transmission information from a transmission of the vehicle, and speed and drive distance information from a vehicle speed sensor of the vehicle; and a display device connected to said control unit for receiving said transmission, speed and drive distance information from said control unit, said display device, comprising:

a transmission display part for displaying a gear position of the transmission of the vehicle and an automatic or manual driving mode of the transmission, said transmission display part including a single gear position display area that displays only one piece of information at a time, said single gear position display area being selectively possible to display both automatic gear positions and manual gear positions when the transmission is in the automatic mode and the manual mode;

a speed display part for displaying vehicle speed; and a drive distance display part for displaying drive distance.

12. The meter for a vehicle according to claim 11, wherein a display area of said driving mode is disposed over or below a display area of said gear position, thereby forming said transmission display part so as to be vertically-long.

13. The meter for a vehicle according to claim 12, wherein said speed display part is arranged on a side of said transmission display part.

14. The meter for a vehicle according to claim 13, wherein said drive distance display part is disposed over or below said speed display part, and said transmission display part is disposed on a side of the speed display part and the drive distance display part.

15. The meter for a vehicle according to claim 12, wherein said drive distance display part is disposed over or below said speed display part, and said transmission display part is disposed on a side of the speed display part and the drive distance display part.

16. The meter for a vehicle according to claim 11, wherein said speed display part is arranged on a side of said transmission display part.

17. The meter for a vehicle according to claim 16, wherein said drive distance display part is disposed over or below said speed display part, and said transmission display part is disposed on a side of the speed display part and the drive distance display part.

18. The meter for a vehicle according to claim 11, wherein said drive distance display part is disposed over or below said speed display part, and said transmission display part is disposed on a side of the speed display part and the drive distance display part.

19. The meter for a vehicle according to claim 11, wherein said single gear position display area selectively displays one of the gear positions D, R, N and L when the transmission is in the automatic driving mode and selectively displays one of the gear positions 1, 2, 3, 4 and 5 when the transmission is in the manual driving mode.

20. The meter for a vehicle according to claim 11, wherein the transmission includes a subtransmission, and the gear positions displayed in the single gear position display area correspond to a selected position of the subtransmission when the transmission is in the automatic driving mode and a gear used in the transmission when the transmission is in the manual driving mode.

21. A saddle-riding type vehicle, comprising:

a vehicle body frame;

a power unit mounted on said vehicle body frame, said power unit including an internal combustion engine and a transmission;

a control unit for receiving transmission information from said transmission of the vehicle, and speed and drive distance information from a vehicle speed sensor of the vehicle; and a display device connected to said control unit for receiving said transmission, speed and drive distance information from said control unit, said display device, comprising:

a transmission display part for displaying a gear position of the transmission of the vehicle and an automatic or manual driving mode of the transmission, said transmission display part including a single gear position display area that displays only one piece of information at a time, said single gear position display area being selectively possible to display both automatic gear positions and manual gear positions when the transmission is in the automatic mode and manual mode;

a speed display part for displaying vehicle speed; and a drive distance display part for displaying drive distance.

22. The saddle-riding type vehicle according to claim 21, wherein said single gear position display area selectively displays one of the gear positions D, R, N and L when the transmission is in the automatic driving mode and selectively displays one of the gear positions 1, 2, 3, 4 and 5 when the transmission is in the manual driving mode.

23. The saddle-riding type vehicle according to claim 21, wherein the transmission includes a subtransmission, and the gear positions displayed in the single gear position display area correspond to a selected position of the subtransmission when the transmission is in the automatic driving mode and a gear used in the transmission when the transmission is in the manual driving mode.

24. A meter for a vehicle, comprising:

a transmission display part for displaying a gear position of a transmission of a vehicle and an automatic or manual driving mode of the transmission;

a speed display part for displaying vehicle speed; and a drive distance display part for displaying drive distance, wherein a single, alphanumeric gear position display area that displays only one piece of information at a time is provided in said transmission display part, said single, alphanumeric gear position display area being selectively changed to display from one of the plurality of gear positions, which include both automatic gear positions and manual gear positions, to another when the transmission is in the automatic mode and when the transmission is in the manual mode, said single gear position display area selectively displaying one of the gear positions D, R, N and L when the transmission is in the automatic driving mode and one of the gear positions 1, 2, 3, 4 and 5 when the transmission is in the manual driving mode.

25. The meter for a vehicle according to claim 24, wherein the transmission includes a subtransmission, and the gear positions displayed in the single gear position display area correspond to a selected position of the subtransmission when the transmission is in the automatic driving mode and a gear used in the transmission when the transmission is in the manual driving mode.

* * * * *